United States Patent Office 3,159,614
Patented Dec. 1, 1964

3,159,614
PROCESS AND THREE-COMPONENT CATALYST FOR PROPYLENE POLYMERIZATION CONTAINING AN ORGANO ALUMINUM COMPOUND AND TITANIUM TETRACHLORIDE - HYDROGEN SULFIDE OR HYDROGEN SELENIDE REACTION PRODUCT
Félix Bloyaert, Watermael-Boitsfort, Brussels, Belgium, assignor to Solvay & Cie, Brussels, Belgium, a Belgian company
No Drawing. Filed Oct. 30, 1961, Ser. No. 148,690
Claims priority, application Netherlands, Nov. 30, 1960, 258,547
6 Claims. (Cl. 260—93.7)

The present invention relates to a process for the polymerization of propylene to give crystalline polymers an important fraction of which has an isotactical structure.

It is known to polymerize propylene in contact with complex catalysts obtained by the reaction of compounds of metals of Groups IVa, Va and VIa of the Periodic System (1959 classification of the Societe Chemique de France) with metals, hydrides or organometallic compounds of metals of Groups I, II and III of the Periodic System.

In particular, the transition metal compounds are halides, alkoxides or halo-alkoxides of titanium or vanadium.

With the aid of these catalysts, propylene polymers are generally produced with a fraction insoluble in boiling hexane rarely exceeding 75 to 80% of the total polymer.

The applicants have developed a process enabling polypropylene to be produced in which the percentage of crystalline polymer exceeds 85% and may even reach approximately 95% of the total polymer.

The process consists in carrying out the polymerization of propylene in the presence of a catalyst obtained by reacting an organometallic compound with the hydrocarbon-insoluble portion of a complex compound obtained by the reaction of a transition metal compound with a compound of the formula $H_2X$ wherein X is a selenium or sulphur atom.

The catalyst used in the process according to the invention is produced by reacting hydrogen selenide or hydrogen sulphide with the transition metal compound, if desired in the presence of an inert hydrocarbon, filtering off the precipitate formed, washing it in the absence of atmospheric humidity with a dry solvent and drying it under vacuum. This complex precipitate is subsequently reacted on an organometallic compound, preferably immediately before the start of polymerization, in the absence of atmospheric humidity.

The transition metal compounds used in the process according to the invention are chiefly halides of metals of Groups IVa, Va or VIa of the Periodic System, preferably titanium tetrachloride.

The reaction between the titanium tetrachloride and the hydrogen selenide or hydrogen sulphide may be carried out at various temperatures. For example, the hydrogen selenide or hydrogen sulphide may be reacted at ambient temperature of the order of 15° C. in the gaseous state with titanium tetrachloride in the pure form or dissolved in a hydrocarbon such as hexane. It is also possible to work at an elevated temperature, for example at the boiling temperature of titanium tetrachloride or of the hydrocarbon used as solvent, up to a temperature of the order of 140° C.

As soon as the hydrogen selenide or hydrogen sulphide comes into contact with titanium tetrachloride in the liquid state, in solution or in the gaseous state, a substantial violet-black crystalline precipitate is formed which after washing and drying is obtained in the form of a fine powder or as leaflets.

The exact nature of this crystalline precipitate has not yet been clearly defined. Presumably it is a complex constituted by a combination, in rather variable proportions, of three compounds of the formulae $TiX_2$, $TiXCl$ and $TiXCl_2$ wherein X is a selenium or sulphur atom, depending on the reagent employed.

Investigation of this complex by X-ray diffraction has not so far enabled known compounds to be detected therein. However, by the same method, it has been possible to prove the absence of the salts $TiCl_3$ and $TiCl_2$ as well as of selenium and sulphur in the free state.

The following Table I enables the results to be compared of the elementary analysis of two complexes based on titanium, selenium and chlorine, one being prepared at ambient temperature, and the other at the boiling temperature of a solution of titanium tetrachloride in hexane. Each of these complexes was then treated with triethyl aluminium and used in a propylene polymerization test, thus enabling the specific activity of the two catalysts to be compared.

TABLE I

| Temperature of preparation of complex | Dosage of elements in the complex compound ||||||  Specific activity of catalyst g. polymer/g. complex/ hour |
|---|---|---|---|---|---|---|---|
| | Se || Ti || Cl || |
| | g./kg. | g.at./kg. | g./kg. | g.at./kg. | g./kg. | g.at./kg. | |
| Ambient | 284 | 3.60 | 287 | 5.99 | 373 | 10.5 | 26 |
| B.Pt. of solution | 285 | 3.61 | 272 | 5.68 | 388 | 10.9 | 8 |

It will be seen that the elementary composition of the complex seems to vary to a rather small extent as a function of the reaction temperature. The specific activities of the catalysts prepared by treating the two complex compounds with triethyl aluminium, however, vary considerably. The catalyst based on the complex produced at ambient temperature has an activity which is more than three times higher. It seems that the physical conformation in which the complex is obtained is the cause of the different activities of the catalyst. When prepared at ambient temperature, the complex is obtained as a very fine powder having a large specific surface. On the contrary, when the complex is prepared at an elevated temperature, it is constituted of brilliant crystalline leaflets having a relatively small specific surface.

The organometallic compound which is reacted with the complex compound in the preparation of the catalyst is selected from organometallic derivatives of metals of Groups I, II, III or IV of the Periodic System. Alkylated, possibly halogenated aluminum derivatives, for example triethyl aluminum, are preferably used.

The polymerization of propylene may be carried out according to known methods: in the absence of any solvent, in solution in a hydrocarbon which dissolves the monomer as well as the polymer, or in the presence of a hydrocarbon in which only the monomer is soluble. The dispersing liquid is an inert hydrocarbon which is liquid under the conditions of polymerization, or the pure monomer kept in the liquid state under the saturation pressure.

The following examples are given for the purpose of illustrating the invention without limiting its scope.

Example 1

(a) *Preparation of the complex compound based on Ti, Cl and Se.*— About 30 g. of pure $TiCl_4$ are dissolved in purified dry hexane. A stream of $H_2Se$ previously dried over $CaCl_2$ and $P_2O_5$ is bubbled in this solution at ambient temperature. The solution immediately acquires a brown colour and a violet-black precipitate separates out. After termination of the reaction, the precipitate is decanted off, washed several times by suspending and stirring it in fresh hexane, then dried. This complex based on titanium, selenium and chlorine is obtained as a very fine powder which is analysed. The results of the elementary analysis are given in the following Table II.

TABLE II

| Element | g./kg. | g.at./kg. | g.at./g.at.of Ti |
| --- | --- | --- | --- |
| Se | 462 | 5.85 | 1.18 |
| Ti | 238 | 4.96 | 1 |
| Cl | 203 | 5.72 | 1.15 |
| As difference: $H_2$ and/or Se | 97 | | |

(b) *Polymerization of propylene.*—976.5 mg. of the complex based on Ti, Cl and Se just prepared are suspended in 40 cc. of dry hexane, 813 mg. of triethyl aluminium are added to the suspension. The suspension is then introduced into a stainless steel autoclave having a capacity of 1.5 litres, and diluted with 1 litre of dry hexane. The temperature of the autoclave is taken to 40° C. and 200 g. of pure propylene are introduced. After reaction for 10 hours, the autoclave is opened in order to allow the monomer to escape and the polypropylene suspension is filtered. The polymer is washed with dry hexane, then treated with an alkaline solution of hydrogen peroxide. It is finally subjected to a treatment with water vapour in the presence of NaOH. The purified polymer is then extracted with boiling heptane. It is found that 85% of the polymer comprises crystalline insoluble polypropylene.

Example 2

(a) *Preparation of the complex compound based on Ti, Cl and S.*—In a flask fitted with cooling device, 84.5 g. of titanium tetrachloride are brought to the boil. A slow stream of $H_2S$ previously dried over $CaCl_2$ and $P_2O_5$ is introduced through a small gas delivery tube immersed in the liquid. The boiling liquid immediately acquires a dark brown colour and a violet-black precipitate is immediately formed. The reaction is continued until the gas delivery tube becomes obstructed. The precipitate is decanted off, washed and dried. It is formed of crystalline leaflets of which an elementary analysis is made. The results of this analysis are given in the following Table III.

TABLE III

| Element | g./kg. | g.at./kg. | g.at./g.at.of Ti |
| --- | --- | --- | --- |
| S | 210 | 6.59 | 0.91 |
| Ti | 350 | 7.30 | 1 |
| Cl | 410 | 11.58 | 1.58 |
| As difference: $H_2$ and/or S | 30 | | |

(b) *Polymerization of propylene.*—255 mg. of the compound based on Ti, S and Cl just prepared are suspended in 1 litre of pure dry hexane. To the suspension there are added 820 mg. of triethyl aluminium, and it is then introduced into an autoclave with a capacity of 1.5 litres. 200 g. of propylene are added and the autoclave is heated to a temperature of 40° C. The reaction proceeds for 10 hours. The autoclave is opened to allow the monomer to escape and the polypropylene suspension is filtered. The polymer is washed with hexane, and then by boiling with a normal NaOH solution. After a final washing with water, the polymer is dried and then extracted with boiling heptane. It is found that 93% of the polymer comprises crystalline insoluble polypropylene.

I claim:

1. A process for the polymerization of propylene to give crystalline high polymers which comprises contacting propylene under conditions of polymerization with a catalyst prepared by the reaction of a hydrocarbon aluminium compound with the hydrocarbon insoluble portion only of a complex compound obtained by the reaction of titanium tetrachloride with a member of the group consisting of hydrogen sulphide and hydrogen selenide.

2. A process for the polymerization of propylene according to claim 1, wherein said hydrocarbon aluminum compound is a trialkyl aluminium.

3. A process for the polymerization of propylene according to claim 1, wherein said reaction of titanium tetrachloride with a member of the group consisting of hydrogen sulphide and hydrogen selenide is carried out at ambient temperature to the boiling temperature of the reaction mixture.

4. A catalyst suitable for the polymerization of propylene which consists of the reaction product of a hydrocarbon aluminum compound with the hydrocarbon insoluble portion only of a complex compound formed by the interaction of titanium tetrachloride with a member of the group consisting of hydrogen sulphide and hydrogen selenide.

5. A catalyst suitable for the polymerization of propylene according to claim 2 wherein said hydrocarbon aluminum compound is a trialkyl aluminum.

6. A catalyst suitable for the polymerization of propylene according to claim 4, wherein said interaction of titanium tetrachloride with a member of the group consisting of hydrogen sulphide and hydrogen selenide is carried out at ambient temperature to the boiling temperature of the reaction mixture.

References Cited by the Examiner

UNITED STATES PATENTS 2,946,778    7/60    Ke et al. _____ 260—94.9
2,999,086    9/61    Fasce _____ 260—94.9

JOSEPH L. SCHOFER, *Primary Examiner.*